United States Patent
Delia et al.

(10) Patent No.: US 9,741,217 B2
(45) Date of Patent: Aug. 22, 2017

(54) METHOD OF ACTIVATING A SUPPLEMENTAL VISUAL WARNING SIGNAL BASED ON FREQUENCY EMITTED FROM A GENERATOR OF A PRIMARY AUDIBLE WARNING SIGNAL

(71) Applicant: International Business Machines Corporation, Armonk, NY (US)

(72) Inventors: David J. Delia, Lagrangeville, NY (US); Wayne M. Delia, Poughkeepsie, NY (US); Edward E. Kelley, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/425,533

(22) Filed: Feb. 6, 2017

(65) Prior Publication Data

US 2017/0148284 A1    May 25, 2017

Related U.S. Application Data

(63) Continuation of application No. 14/487,247, filed on Sep. 16, 2014, now Pat. No. 9,582,974, which is a
(Continued)

(51) Int. Cl.
*G08B 1/08* (2006.01)
*G08B 7/06* (2006.01)
(Continued)

(52) U.S. Cl.
CPC .............. *G08B 7/06* (2013.01); *A41D 1/002* (2013.01); *A63B 71/0616* (2013.01); *A63B 71/0619* (2013.01); *A63B 71/0622* (2013.01); *H04B 1/385* (2013.01); *H04W 4/021* (2013.01); *H04W 56/001* (2013.01); *H04W 72/0453* (2013.01);
(Continued)

(58) Field of Classification Search
CPC ...... G08B 7/06; A41D 1/002; A63B 71/0616; A63B 71/0619; A63B 71/0622; A63B 2071/0625; A63B 2071/0627; A63B 2071/0655; A63B 2225/50;
(Continued)

(56) References Cited

U.S. PATENT DOCUMENTS 3,872,440 A * 3/1975 Benz .................... H04M 11/027
340/286.07
5,293,354 A    3/1994 Costabile
(Continued)

*Primary Examiner* — Naomi Small
(74) *Attorney, Agent, or Firm* — Scully, Scott, Murphy & Presser, P.C.; Nicholas Bowman, Esq.

(57) ABSTRACT

A system and method for signaling users including a control device electrically connected to a transceiver. The transceiver has a specified frequency. A first mobile signal device being activated by a first user and electrically communicating with a first transmitter having a selectable signal frequency. The first transmitter electrically communicates with the transceiver using the specified frequency. A second signal device includes a second receiver for receiving an activation signal from the transceiver. The second receiver electrically communicates with the transceiver using the specified frequency. The second signal device is activated by the activation of the first mobile signal device using the transceiver for alerting other persons.

20 Claims, 4 Drawing Sheets

Related U.S. Application Data continuation of application No. 12/257,698, filed on Oct. 24, 2008, now Pat. No. 8,866,599.

(51) Int. Cl.
*H04W 4/02* (2009.01)
*H04W 72/04* (2009.01)
*H04W 56/00* (2009.01)
*H04B 1/3827* (2015.01)
*A63B 71/06* (2006.01)
*A41D 1/00* (2006.01)

(52) U.S. Cl.
CPC .......... *A63B 2071/0625* (2013.01); *A63B 2071/0627* (2013.01); *A63B 2071/0655* (2013.01); *A63B 2225/50* (2013.01)

(58) Field of Classification Search
CPC .. A63B 2071/0027; H04B 1/385; H04B 1/38; H04W 56/001; H04W 72/0453
USPC .................................................. 340/539.17
See application file for complete search history.

(56) References Cited

U.S. PATENT DOCUMENTS

| | | | |
|---|---|---|---|
| 5,319,355 A | 6/1994 | Russek | |
| 5,553,860 A * | 9/1996 | Zelikovich | F41J 5/04 273/371 |
| 6,181,236 B1 * | 1/2001 | Schneider, Jr. | G08B 1/08 340/323 R |
| 6,588,661 B2 | 7/2003 | Degrauwe et al. | |
| 6,720,867 B2 | 4/2004 | Baker | |
| 6,794,989 B2 | 9/2004 | Naegely et al. | |
| 6,816,442 B1 * | 11/2004 | Heiman | G04G 21/06 340/309.16 |
| 7,031,225 B2 | 4/2006 | McDonald | |
| 7,173,533 B1 | 2/2007 | Beron et al. | |
| 7,173,553 B2 * | 2/2007 | Ohmi | H03M 1/687 341/144 |
| 7,218,216 B1 | 5/2007 | Uehran | |
| 7,561,494 B2 * | 7/2009 | Stern | G10K 5/00 340/323 R |
| 8,866,599 B2 | 10/2014 | Delia et al. | |
| 2002/0060628 A1 * | 5/2002 | Baker | A63B 71/06 340/540 |
| 2003/0006903 A1 * | 1/2003 | Naegely | G08B 1/08 340/4.12 |
| 2004/0201475 A1 * | 10/2004 | Menard | G08B 1/08 340/539.17 |
| 2005/0162257 A1 * | 7/2005 | Gonzalez | A63B 24/0021 340/323 R |
| 2006/0180073 A1 * | 8/2006 | Nakamoto | G10K 5/00 116/200 |
| 2007/0011589 A1 | 1/2007 | Palanki | |
| 2008/0068174 A1 * | 3/2008 | Al-Mahdawi | H04B 5/0062 340/572.7 |
| 2008/0137604 A1 * | 6/2008 | Lee | H04W 28/08 370/330 |
| 2010/0102938 A1 | 4/2010 | Delia et al. | |
| 2015/0002294 A1 | 1/2015 | Delia et al. | |

* cited by examiner

METHOD OF ACTIVATING A SUPPLEMENTAL VISUAL WARNING SIGNAL BASED ON FREQUENCY EMITTED FROM A GENERATOR OF A PRIMARY AUDIBLE WARNING SIGNAL

CROSS REFERENCE TO RELATED APPLICATION

This application is a continuation of co-pending patent application Ser. No. 14/487,247, filed Sep. 16, 2014, which is a continuation of application Ser. No. 12/257,698, filed Oct. 24, 2008. The entire contents and disclosures of applications Ser. Nos. 14/487,247 and 12/257,698 are hereby incorporated herein by reference in their entireties.

BACKGROUND

The present invention relates to a system and method for activating multiple alert signals, and more specifically, activating multiple alert signals wherein a first alert signal activates one or more second alert signals.

Currently, signaling or alert systems may utilize wired or wireless transmission to a remote receiver to indicate, for example, a predetermined time period at the remote receiver. For example, signaling in sporting events include officials or referees signals relating to rules and an official time clock include electrically communication between an official's whistle to a time display clock. Other systems include corresponding game rule signals, which may be communicated using hand signals or audibly by a mobile official or referee, with a visual or audible signal activated by the official or referee. Other systems disclose using a tactile notification, i.e., touching, or non-audio, activated by an official at a sporting event.

Further, audible warning signals are produced in events such as sporting contests to indicate that play should start or stop at a certain time. For example, a referee's whistle is blown to indicate the start of play in a soccer match, football game, or volleyball match. Problems are encountered with this technique which include, deaf participants not being able to determine the precise instant of play stopping or play starting, which may result in confusion and the possibility of injuries. Further, participants in sporting event tournaments in which matches are held on adjacent courts may have difficulty determining whether or not an audible signal was initiated by the referee of their particular contest. Additionally, participants in a sporting event simply may not hear the referee's whistle, or mistake the referee's whistle for an unrelated sound.

Devices exist which provide both an audible and visual warning signal as part of the same unit, such as a fire alarm. Also, devices hard-wired into the timing system governing a sporting event produce an automatic audible and visual signal at a predetermined time, such as the horn sounding and a neon light activation on the backboard of a basketball goal at the end of a quarter.

Known systems disclose activation of a plurality of visual or tactile alert signals upon activating a primary audio alert signal. For example, a referee's whistle can activate a wireless signal transmitted to receivers that activate lights and/or vibrating devices worn by sports participants. Lights can be mounted on basketball backboards, goals, or scorer's table indicating the whistle has been blown and play has been stopped. Vibrating devices, such as a wristband, enable deaf players to receive real time alerts that a whistle has been blown and play has stopped.

Another known signaling system includes alerting sports participants who cannot detect audible signals. A transceiver is configured to detect a first signal and an additional signal. The first signal is transmitted from an activation device such as a whistle and the additional signal is transmitted from another activation device that is a remote control. The transceiver sends a second signal in response to detection of the first signal or the additional signal. The second signal is a radio signal transmitted at a preselected frequency range and carries information as to whether the first signal or the additional signal was detected.

Another known signaling system includes a method for alerting basketball fans of successful three point shots. The on-court official could actuate the sound-processing card remotely. This can be easily accomplished by integrating a remote control device that can actuate the sound card located on the official scorers table. This remote control device could be incorporated into the official's whistle or other handheld object. A light or other visual indicator is located within the line of sight of the majority of the fans of the basketball game. Once the official actuates the sound-processing mechanism, a signal is also sent to the light actuation mechanism to turn on the light or visual alarm.

A further known signaling system discloses a method and system for a remotely actuatable sports timing system. Indicator lights are responsive to whistle signals received from transmitters to operate as a built-in test circuit to indicate that a signal is being received from each radio transmitters or by their failure to glow to indicate a fault in the radio transmission of a particular transmitter.

In another known system, a wireless multiple non-synchronized athletic event time keeping and communication system is disclosed. A timekeeper or official starts or stops a clock and a transmission means located in a timing communicator sends a signal to the small mobile field communicator worn by the referee on the field, which may also be a floor, mat or any other term used by the particular sport to describe the area or location of play. The small mobile field communicator worn by the referee converts this signal into a tone, vibration or flashing light for transmission and communication with the referee. In the preferred embodiment of the system the field communicator's receipt of a signal activates both a flashing light and vibration mechanism. Further, pre-time expiration warning signals may be sent to the field communicator worn by the referee.

Another known system includes a method and system for a control circuit to sense the time period end in a sporting event and other time information and uses a transmitter to transmit a digital or other signal to a sensory receiver, for example, a receiver held by an official or a scoreboard.

However, none of the known signaling systems resolve the problem when multiple areas having activities and receiving signals are adjacent to each other and the signals intended for one area can be mistaken by an adjacent area, and/or multiple receivers can receive and initiate a signal intended for a particular receiver. Thus, a need exists to resolve the problem of a person misinterpreting a signal and/or a secondary signal device mistakenly receiving a signal to initiate a secondary indicator. For example, this problem is most prevalent when multiple areas of play in a sport or multiple sports are adjacent each other such that an official's signal may be mistaken by an adjacent play area. This may occur from adjacent players hearing or seeing a signal not intended for their area and/or a wireless receiving device may mistakenly receive an unintended signal and activating an alarm, e.g., time alarm, or an official signal. Such unwanted activation of an alert or mistakenly reacting to an alert signal by a player can cause an unintentional stop of play or a time period erroneously being expired.

It would therefore be desirable to provide a system and method for providing one or more supplemental signals, e.g., visual signals, indicating that a first signal, e.g., an audible signal has been produced. It would further be desirable for the system and method to avoid confusion of the corresponding first and supplemental signals with other corresponding first and supplemental signals by the players as well as erroneously activation of neighboring signals in a multi court or multi field area or arena.

SUMMARY OF THE INVENTION

In an aspect of the invention a system for signaling users includes a control device and a transceiver electrically communicating with the control device. The transceiver has a specified frequency. A first mobile signal device is activated by a first user to indicate a predetermined event. The first mobile device electrically communicates with a first transmitter having a selectable signal frequency, and the first transmitter electrically communicates with the transceiver using the specified frequency. A second signal device includes a second receiver for receiving an activation signal from the transceiver. The second receiver electrically communicates with the transceiver using the specified frequency being selected by the control device. The second signal device is activated by the activation of the first mobile signal device using the transceiver for alerting another user.

In a related aspect, the first signal device belongs to a first group of devices generating sensory stimulation of the user, and the second signal device belongs to a second group of devices generating sensory stimulation of the another user. In another aspect, the first group includes first devices generating audible alerts. The second group may also include second devices generating visual alerts. The first group may include first devices generating audible signals, and the system may further include an audible device being selected from the first group comprising: a whistle, a horn, and an alarm claxon. The second group may include second devices generating visual alerts, and the system may further comprise a visual device being selected from the second group comprising: a flashing light and a strobe light. The system may further include a third signal device being activated by the activation of the first mobile signal device, and the third signal device being part of a third group of devices generating stimulation to a user. The stimulation may be a vibration. The third signal device may be part of an article of clothing and the signal device may generate a vibration to the user. The third signal device may be a vibrating device. The first signal device may be battery powered. The second signal device may be mobile. The system may further include a plurality of defined areas wherein each area includes a transceiver having a specified frequency, and each of the defined areas include a first signal device including a switchable frequency transmitter having the specified frequency matching the specified frequency of the respective transceiver. Further, at least one second signal device has the specified frequency matching the specified frequency of the transceiver. In another aspect, the first mobile signal device and the transmitter, the transmitter and the transceiver, and the transceiver and the second signal device communicate wirelessly. The second signal device may be activated for a predeterminable time interval.

In another aspect of the invention, a method of systematically signaling users includes: providing a control device; providing a transceiver electrically communicating with the control device, and the transceiver having a specified frequency; activating a first mobile signal device to indicate a predetermined event, the first mobile device electrically communicating with a first transmitter; selecting a signal frequency for the first transmitter, and the first transmitter electrically communicating with the transceiver using the specified frequency; providing a second signal device including a second receiver; selecting the specified frequency for the receiver; receiving an activation signal from the transceiver, the second receiver electrically communicating with the transceiver using the specified frequency being selected by the control device; and activating the second signal of the second signal device for alerting users when the first mobile signal device is activated.

In a related aspect, the method further includes generating audible alerts using the first signal device, and the first signal device being from a first group. The method may further include generating visual alerts using the second device, and the second signal device being from a second group. Also, the method may further include activating a third signal device when the first mobile signal device is activated, and the third signal device being part of a third group of devices generating stimulation to a user including vibration.

In another aspect of the invention, a computer program product comprises a computer readable medium having a computer program recorded thereon. The computer program is executed by a processor in a computer system for systematically signaling users, the computer program performs the steps of: determining a specified frequency for a first transmitter of a first mobile signal device indicating a predetermined event; selecting the specified frequency for a transceiver communicating with the first transmitter, and the transceiver electrically communicating with a control device which includes the computer program; and selecting the specified frequency for a second receiver of a second signal device, the second receiver receiving an activation signal from the transceiver, and the second signal device being activated for alerting users when the first mobile signal device is activated.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION OF THE INVENTION

Figure 1:
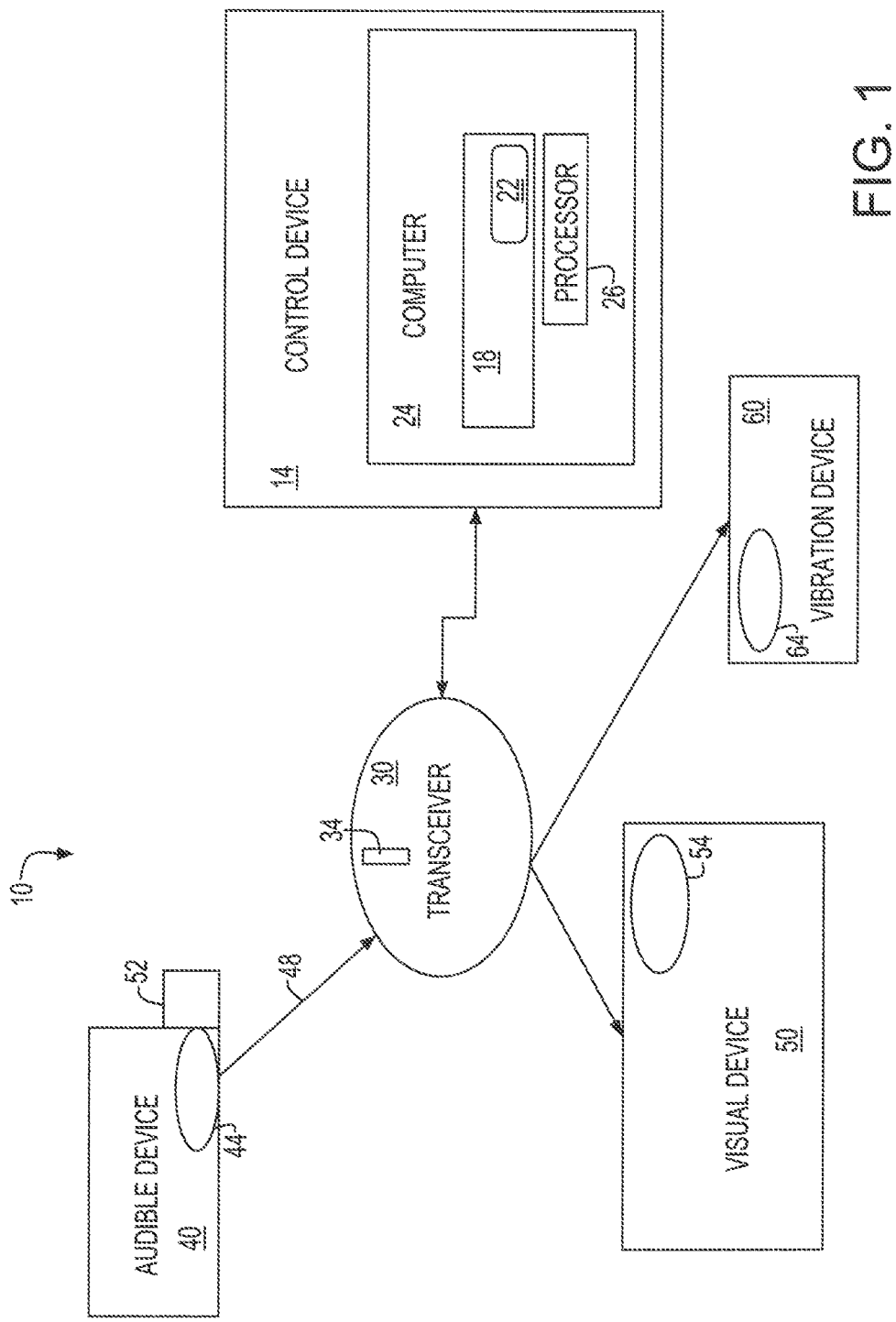
FIG. 1 is a block diagram of a signaling system according to an embodiment of the invention.

Referring to FIG. 1, an embodiment according to the invention of a system 10 for signaling users includes a control device 14 including a computer 24 having a computer program 22 stored on a computer readable medium embodied as a data storage device 18, and a processor 26.

The control device 14 electrically communicates with a transceiver 30 operating on one or more specified frequencies. The transceiver 30 includes an antennae 34 for transmitting and receiving signals. A first mobile signal device is embodied as an audible device 40, for example, a referee's whistle, which is activated by a first user, for example, a referee or official at a sporting event. The audible device 40 electrically communicates with a first transmitter 44 having a selectable signal frequency using a frequency adjustment device 52. The first transmitter 44 electrically communicates with the transceiver 30 using the specified frequency.

Second signal devices are embodied as a visual device 50 and a vibration device 60 as an embodiment of a tactile alert device. The visual device 50 includes a second receiver 54 for receiving an activation signal from the transceiver 30. The vibration device 60 includes another second receiver 64 for receiving an activation signal from the transceiver 30. The second receivers 54, 64 electrically communicate with the transceiver 30 using the specified frequency. The visual device 50 and vibration device 60 are activated by the audible device 40 initiating the first transmitter 44, which initiates the transceiver 30 to activate the visual device 50 and the vibration device 60. The duration of the time interval the visual alert device is on or other alert device is on may be configurable to allow for different time durations. The transmitter 44 and receivers 54, 64, as well as the transceiver 30, are preferable wireless and may be powered by small lithium batteries.

In alternative embodiments, one or more visual devices 50 can be mounted on basketball backboards, goals, or scorer's table indicating a whistle 110 has blown and play has been stopped. The vibrating devices 60 may be integrated in a wristband or article of clothing such as a vest 130 enabling deaf players to receive real time alerts that the whistle 110 has been blown and play has been stopped.

Figure 2:
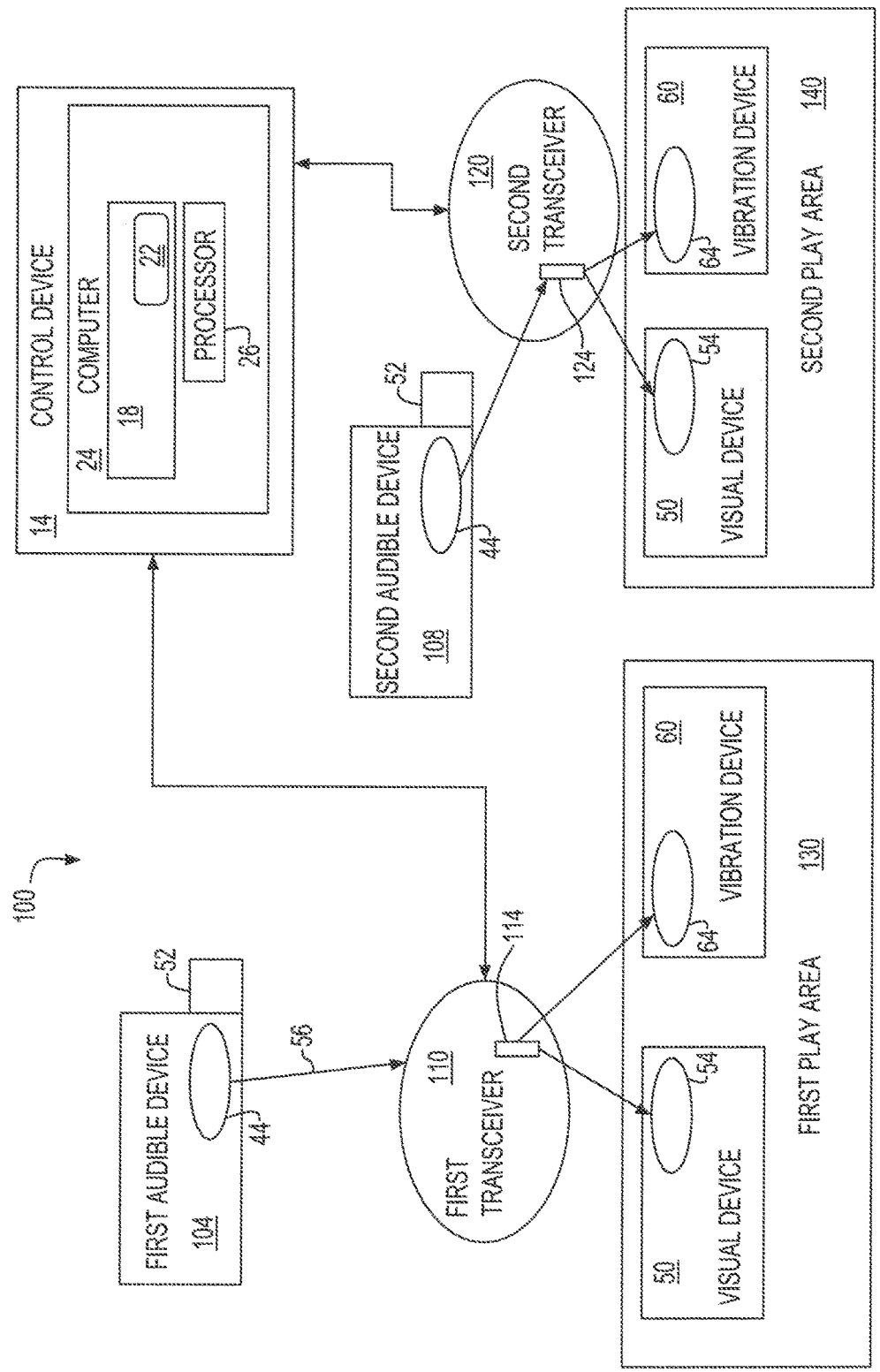
FIG. 2 is a block diagram of a signaling system according to another embodiment of the invention including adjacent play areas.

Referring to FIG. 2, another embodiment of a signaling system 100 according to the invention, wherein like elements with the system 10 shown in FIG. 1 have the same reference numerals, includes a first audible device 104 and a second audible device 108, for example being whistles, having transmitters 44. The transmitter 44 of the audible devices 104, 108 emit signals 56 to a first transceiver 110 and a second transceiver 120, respectively. The transmitted signals 56 have different frequencies which are adjustable using frequency adjustment devices 52. The first transceiver 110 and the second transceiver 120 both include antennas 114 and 124, respectively, set to a selectable frequency using the control device 14. The frequencies of the first and second transceivers 110, 120 are set and monitored by a control device 14. The control device includes a computer 24 including a program 22 stored on a data storage device 18 and executed by a processor 26.

Adjacent areas are embodied as a first play area 130 and a second play area 140 and for exemplary purposes are adjacent sport play areas, for example, basketball courts, racquetball courts, or soccer fields. The first play area 130 includes a visual device 50 having a receiver 54 set to the same frequency as the first transceiver. Likewise, a vibration device 60 has a receiver 64 set to the same frequency as the first transceiver. The first audible device 104 is selectively set to the same frequency as the first transceiver 110 using the frequency adjustment device 52. The first audible device 104 thus only activates the visual device 50 and vibration device 60 in the first play area 130.

The second play area 140 also includes a visual device 50 having a receiver 54 and a vibration device 60 having a receiver 64 both set to the a different frequency than the visual device and vibration device of the first play area 130. The second audible device 108 is selectively set to the same frequency as the second transceiver 120 and the visual device 50 and the vibration device 60. The second audible device 108 thus only activates the visual device 50 and vibration device 60 in the second play area 140. The first and second audible devices 104, 108 do not interfere with each other as they are set to transmit at different frequencies matching the visual device and vibration device in their respective play areas 130, 140.

Figure 3:
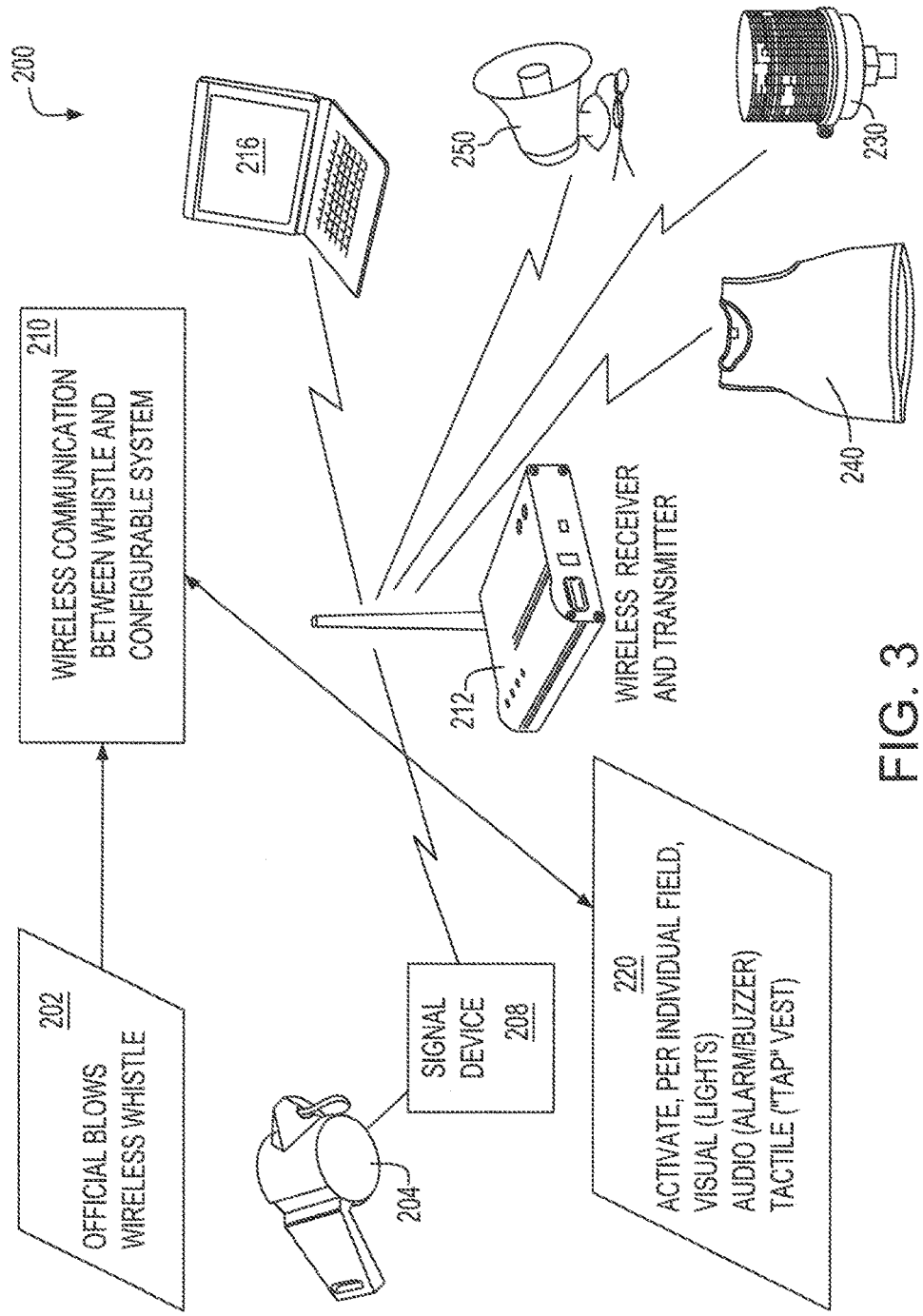
FIG. 3 is a diagram of method steps, system components and exemplary signaling devices according to one embodiment of the invention.

Referring to FIG. 3, a method 200 for an exemplary embodiment of the present invention includes, an official blowing a whistle 204 capable of wireless transmission using a signal device 208 electrically communicating with the whistle 204 in step 202. The signal device 208 includes a transmitter and communicates blowing the whistle 204 with the wireless transceiver 212 which in turn communicates with a computer 216 in step 210. The computer 216 determines the frequency that the wireless transceiver 212 receives and sends signals to a selected field or play area in a multiple field area in step 220. The transceiver 212, activated by the whistle 204, activates the secondary alerts embodied as a visual alert, e.g., light 230, a vibration alert, e.g., vest with vibration device 240, and an audible alert, e.g., horn 250. Thus, the computer 216 may also configure multiple wireless transceivers by determining specified frequency for each transceiver. Further, the computer 216 may switch or reallocate frequencies from first audible devices, e.g., whistles, to transceivers, and from transceivers to receivers in different play areas or fields. Additionally, the computer 216 may communicate via a network with a global timing system, such as used in tournament play, to provide an automatic alert signal based on synchronized time.

Figure 4:
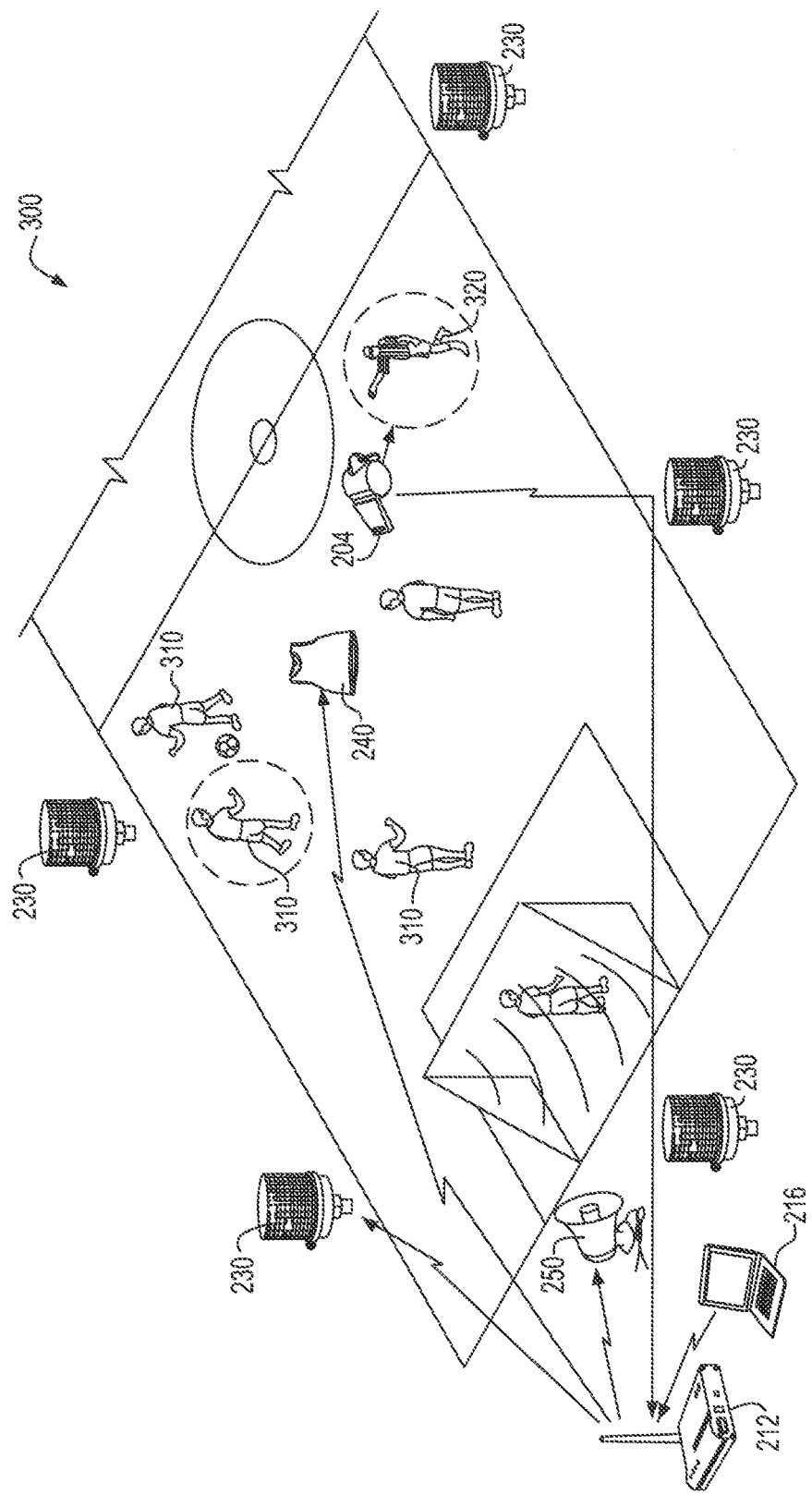
FIG. 4 is a perspective view of an embodiment of the invention including a court as a play area using a plurality of auditory and visual signal devices.

Referring to FIG. 4, in an exemplary embodiment of the invention according to the present invention, an illustrative area embodied as a field or court 300 is understood to be one court of a plurality of adjacent courts. The court 300 includes an auditory device embodied as a whistle 204 used by an official or referee 320. In operation, the official or referee 320 has the whistle 204 and sets the whistle 204 signal device or transmitter 208 to a specified frequency. The referee's whistle activates the horn 250 using the transceiver 212 designated for the court 300. The computer 216 communicates with the transceiver 212 and implements a specified frequency for the court 300 which is different than other adjacent courts. The frequency of the whistle 204 is also set, for example by the referee, for the same frequency as the transceiver 212 designated for the court 300. Once the referee blows the whistle 204, the whistle 204 activates the horn 250 using the transceiver 212. The transceiver 212 also activates the secondary devices in the court 300, i.e., lights 230 positioned on opposing sides of the court and a third side of the court behind the net 320, and a vibration device in a vest 240 worn by a player 310.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A system to activate supplemental signals in response to primary signals, the system comprising:
   a plurality of first signal devices for generating the primary signals, each of the first signal devices being associated with one of a plurality of defined areas to generate one of the primary signals to indicate specified events associated with said one of the plurality of defined areas;

a plurality of second signal devices for generating the supplemental signals, each of the second signal devices being associated with one of the defined areas;

a plurality of transceivers for selectively activating the second signal devices in response to the primary signals generated by the first signal devices, each of the plurality of transceivers having a settable operating frequency for associating said each transceiver with a respective one of the defined areas, and each of the first signal devices being associated with one of the plurality of transceivers; and a control to set the operating frequencies of the plurality of transceivers to associate each of the transceivers with a respective one of the defined areas; wherein when each of the first signal devices generates one of the primary signals to indicate one of the specified events relating to the one of the defined areas associated with said each first signal device, said each first signal device sends an event signal to the one of the transceivers associated with said one of the defined areas, and in response, the one of the transceivers sends an activation signal to the one or more of the second signal devices associated with said one of the defined areas, and each of the one or more of the second signal devices generates one of the supplemental signals to confirm that said each of the first signal devices has generated one of the primary signals to indicate the one of the specified events related to said one of the defined areas.

2. The system according to claim 1, wherein:
each of the first signal devices sends the event signal generated by said each first signal at an adjustable frequency; and
each of the first signal devices includes a frequency control for adjusting the frequency of the event signal sent by said each first signal to associate said each first signal device with the one of the transceivers associated with the said one of the defined areas.

3. The system according to claim 2, wherein:
the operating frequencies of the transceivers are adjustable; and
the control adjusts the operating frequencies of the transceivers to associate each of the transceivers with the respective one of the defined areas.

4. The system according to claim 1, wherein the primary signals provide sensory stimulation of a person, and the supplemental signals provide sensory stimulation of said person or of one or more other persons.

5. The system according to claim 1, wherein the primary signals are audible alerts.

6. The system according to claim 1, wherein the supplemental signals are visual alerts.

7. The system according to claim 1, further comprising third signal devices activated by activation of the first signal devices to generate stimulation of persons.

8. The system according to claim 7, wherein the third signal devices are vibrators.

9. The system according to claim 8, wherein the vibrators are parts of articles of clothing worn by said persons.

10. The system according to claim 1, wherein each of the first signal devices is associated with only one of the plurality of defined areas.

11. A method for activating supplemental signals in response to primary signals, the method comprising:
using a plurality of first signal devices for generating the primary signals, each of the first signal devices being associated with one of a plurality of defined areas to generate one of the primary signals to indicate specified events associated with said one of the plurality of defined areas;
operating a plurality of second signal devices for generating the supplemental signals, each of the second signal devices being associated with one of the defined areas;
operating a plurality of transceivers for selectively activating the second signal devices in response to the primary signals generated by the first signal devices, each of the plurality of transceivers having a settable operating frequency for associating said each transceiver with a respective one of the defined areas, and each of the first signal devices being associated with one of the plurality of transceivers; and
setting the operating frequencies of the plurality of transceivers to associate each of the transceivers with a respective one of the defined areas; wherein when each of the first signal devices generates one of the primary signals to indicate one of the specified events relating to the one of the defined areas associated with said each first signal device, said each first signal device sends an event signal to the one of the transceivers associated with said one of the defined areas, and in response, the one of the transceivers sends an activation signal to the one or more of the second signal devices associated with said one of the defined areas, and each of the one or more of the second signal devices generates one of the supplemental signals to confirm that said each of the first signal devices has generated one of the primary signals to indicate the one of the specified events related to said one of the defined areas.

12. The method according to claim 11, wherein:
each of the first signal devices sends the event signal generated by said each first signal at an adjustable frequency; and
each of the first signal devices includes a frequency control for adjusting the frequency of the event signal sent by said each first signal to associate said each first signal device with the one of the transceivers associated with the said one of the defined areas.

13. The method according to claim 11, wherein:
the operating frequencies of the transceivers are adjustable; and
the control adjusts the operating frequencies of the transceivers to associate each of the transceivers with the respective one of the defined areas.

14. The method according to claim 11, further comprising activating vibrating devices when the first signal devices are activated.

15. The method according to claim 14, wherein said vibrating devices are worn by persons.

16. A computer program product comprising a computer readable deice having a computer program tangibly embodied therein, the computer program being executed by a processor in a computer system for activating supplemental signals in response to primary signals, the computer program, when executing by said processor, performing:
receiving the primary signals from a plurality of first signal devices, each of the first signal devices being associated with one of a plurality of defined areas to generate one of the primary signals to indicate specified events associated with said one of the plurality of defined areas;

operating a plurality of second signal devices for generating the supplemental signals, each of the second signal devices being associated with one of the defined areas;

operating a plurality of transceivers for selectively activating the second signal devices in response to the primary signals generated by the first signal devices, each of the plurality of transceivers having a settable operating frequency for associating said each transceiver with a respective one of the defined areas, and each of the first signal devices being associated with one of the plurality of transceivers; and operating a control to set the operating frequencies of the plurality of transceivers to associate each of the transceivers with a respective one of the defined areas; wherein when each of the first signal devices generates one of the primary signals to indicate one of the specified events relating to the one of the defined areas associated with said each first signal device, said each first signal device sends an event signal to the one of the transceivers associated with said one of the defined areas, and in response, the one of the transceivers sends an activation signal to the one or more of the second signal devices associated with said one of the defined areas, and each of the one or more of the second signal devices generates one of the supplemental signals to confirm that said each of the first signal devices has generated one of the primary signals to indicate the one of the specified events related to said one of the defined areas.

of the supplemental signals to confirm that said each of the first signal devices has generated one of the primary signals to indicate the one of the specified events related to said one of the defined area.

17. The computer program product according to claim 16, wherein:
each of the first signal devices sends the event signal generated by said each first signal at an adjustable frequency; and
each of the first signal devices includes a frequency control for adjusting the frequency of the event signal sent by said each first signal to associate said each first signal device with the one of the transceivers associated with the said one of the defined areas.

18. The computer program product according to claim 16, wherein:
the operating frequencies of the transceivers are adjustable; and
the control adjusts the operating frequencies of the transceivers to associate each of the transceivers with the respective one of the defined areas.

19. The computer program product according to claim 16, wherein the operating the plurality of second signal devices includes operating the plurality of the second signal devices to generate the supplemental signals for predeterminable time intervals.

20. The computer program product according to claim 16, wherein the operating the control to set the operating frequencies of the one or more transceivers includes:
reallocating frequencies from the first signal devices to the transceivers, and reallocating frequencies from the one or more transceivers to the second signal devices; and
communicating via a network with a global timing system to provide an automatic alert signal based on synchronized time.

* * * * *